United States Patent [19]

Smith

[11] 4,245,055
[45] Jan. 13, 1981

[54] EXPANDABLE RUBBER/RESIN BLEND AND RESULTING FOAM

[75] Inventor: Wayne E. Smith, Washington Boro, Pa.

[73] Assignee: Armstrong Cork Company, Lancaster, Pa.

[21] Appl. No.: 103,554

[22] Filed: Dec. 14, 1979

Related U.S. Application Data

[63] Continuation of Ser. No. 7,234, Jan. 29, 1979, abandoned.

[51] Int. Cl.$^3$ .............................................. C08J 9/10
[52] U.S. Cl. ................................... 521/140; 521/75; 521/98; 521/907; 525/229; 525/230
[58] Field of Search ................. 525/229, 230; 521/140

[56] References Cited

U.S. PATENT DOCUMENTS

| | | | |
|---|---|---|---|
| 2,753,322 | 7/1956 | Parks et al. | 525/230 |
| 2,757,147 | 7/1956 | Pooley | 521/140 |
| 2,788,333 | 4/1957 | Lewis et al. | 521/140 |
| 2,849,028 | 8/1958 | Clark et al. | 521/140 |
| 2,956,041 | 10/1960 | Reid . | |
| 3,660,529 | 5/1972 | Groch | 525/230 |
| 3,808,293 | 4/1974 | Garrison, Jr. | 525/230 |
| 3,944,508 | 3/1976 | Barth et al. | 525/230 |
| 4,025,465 | 5/1977 | Dorrn et al. . | |
| 4,043,958 | 8/1977 | Whelan | 521/140 |

FOREIGN PATENT DOCUMENTS

47-8147 3/1972 Japan .

*Primary Examiner*—Morton Foelak

[57] ABSTRACT

An expandable resin/rubber blend comprising a butadiene-acrylonitrile rubber, a vinyl chloride resin, and a polymethylmethacrylate, adapted to form chemically blown, predominantly closed cell foam in a density range of about 1.8–4 pounds/cu. ft.

4 Claims, No Drawings

EXPANDABLE RUBBER/RESIN BLEND AND RESULTING FOAM

CROSS REFERENCE TO RELATED APPLICATION

This is a continuation, of application Ser. No. 7,234, filed Jan. 29, 1979 now abandoned.

BACKGROUND OF THE INVENTION

The resin/rubber blend of the present invention is useful in making unusually low density foams of a predominantly closed cell structure. In the form of sheets and hollow cylinders, these low density, closed cell foams serve as excellent heat insulating material. When appropriately shaped, the foams serve as expansion joint and sealers generally.

In all of these applications, it is the general rule that the lower the density, the better the product, provided strength, structural integrity, and improved thermal conductivity can be maintained during the useful life of the product. Since it is generally true that the product becomes more flimsy as the density is diminished, it has been necessary to use higher density foams in order to maintain performance characteristics. Typical products made from resin/rubber blends in the past have had densities in the range of about 4.5–6 pounds/cu. ft. These products have generally been satisfactory. However, by virtue of the resin/rubber blend of the present invention, densities in the range of 1.8–4 pounds/cu. ft. are readily obtainable, and commercial products having densities of about 3 pounds/cu. ft. may be routinely produced reproducibly. These lower density products have improved thermal conductivity, in addition to the obvious advantages of cost savings of material and shipping.

DESCRIPTION OF THE PRIOR ART

The patent best exemplifying the prior products is U.S. Pat. No. 2,849,028 Clark et al. This patent teaches use of a two-component resin/rubber blend to form predominantly closed cell products having the same utility as the products contemplated by the present invention. The resin/rubber ratios have changed over the years, and the actual resins and rubbers have also varied over the years in the production of these two-component systems. These are the products, with their densities in the range of about 4.5–6 pounds/cu. ft., that have been the standard in the industry.

U.S. Pat. No. 2,788,333 Lewis et al. also shows a two-component resin/rubber blend for making a foam product.

Other patents disclose various modifications of resin/rubber blends, including mixtures of polyvinyl chloride, butadiene-acrylonitrile rubbers to form foamed products.

SUMMARY OF THE INVENTION

A resin/rubber blend adapted to form substantially closed cell, low density foams in the range of about 1.8–4 pounds/cu. ft. on being blown at elevated temperature by means of a chemical blowing agent, the blend comprising relative portions of 100 parts by weight of a nitrile-butadiene rubber containing about 20–45 percent by weight of acrylonitrile; 40–200 parts by weight of a vinyl chloride resin which may be polyvinyl chloride, a vinyl chloride-vinyl acetate copolymer, or mixtures thereof; and about 25–200 parts by weight polymethylmethacrylate (PMMA), with the proviso that the PMMA be present in the blend in an amount of at least 9 percent by weight of the total blend.

PREFERRED EMBODIMENT OF THE INVENTION

The butadiene-acrylonitrile rubber (NBR) useful in the present invention is a standard item of commerce. The Mooney viscosity generally runs between 25 and 90. The NBR will contain between 20 and 45 percent by weight acrylonitrile, with an average of about 30 percent by weight. It is purchased and used in the present invention in the form of a dry rubber. In describing the resin/rubber blend of the present invention, it is convenient to base everything on 100 parts by weight of the NBR. The phrase "relative proportions" as used herein simply means that the amounts of the several ingredients are adjusted on a basis of 100 parts by weight NBR, no matter what actual weight of the NBR is actually used. In some instances, as will be seen in the examples, a 70/30 NBR/resin mixture is used, but the critical ingredients will be calculated out as if 100 parts by weight NBR were used.

The second ingredient in the resin/rubber blend of the present invention is a vinyl chloride resin. This term includes the homopolymer polyvinyl chloride and the copolymer vinyl chloride-vinyl acetate. The polyvinyl chloride (PVC) are standard items of commerce made by solution, suspension, or emulsion polymerization and are generally considered to be low molecular weight with a relative viscosity up to about 2.2. The PVC is sold and used in the form of a white powder.

The vinyl chloride-vinyl acetate copolymer (VCVA) contains about 1.5–20 percent by weight vinyl acetate, and usually contains 10–15 percent by weight. It, too, is a standard item of commerce and is sold and used in the present invention in the form of a white powder.

To achieve the unusually low density foams of the present invention, the PVC or the VCVA must be used in an amount of about 40–200 parts by weight for each 100 parts by weight of the NBR. This amount of 40–200 parts by weight of this resin may constitute 100% PVC or 100% VCVA. Put another way, either of these two vinyl chloride resins functions adequately in the present invention to allow the production of these unusual foams. Since either of the two vinyl chloride resins may be used to the exclusion of the other, it is apparent that mixtures of the two can be used in which the mixture will range from a mere trace of one in almost 100% of the other, all the way to the exact reverse situation. As a practical matter, it is usually preferable to use a mixture of the two vinyl chloride resins, and the mixture would usually be about 1:1. This 1:1 ratio will often be varied according to the existencies of local supplies, local forming equipment, the views of the foreman running the line, and other such intangibles. Most often, the ratio PVC:VCVA will fall in the range 70:40 to 40:70.

The final ingredient in the resin/rubber blend of the present invention, and the one which primarily allows the production of these unusually low density foams, is the PMMA. Again, the PMMA is an item of commerce sold and used in the form of a free-flowing white powder. It is sometimes sold and mixed with small amounts of copolymers of methylmethacrylate, but these normally have little or no effect on the present invention. It is preferred that over half of the PMMA powder pass through a 200 mesh screen, since the smaller particle size appears to aid in forming a good blend. The molecular weight of these PMMA's normally varies around a central point of about 1,000,000; and useful PMMA's are sold in a molecular weight range of about 700,000 to about 1,250,000. These PMMA's are normally sold as processing aids for PVC. Their presence in small amounts aids the physical processing of PVC's when the PMMA is present in an amount of 1–2 percent by weight of the PVC, up to a maximum 5 perceby weight. The amount of PMMA to be used in the present invention will be in the range of about 25–200 parts by weight PMMA per 100 parts by weight NBR, with the proviso that the resin/rubber blend contain at least 9 percent by weight PMMA of the total composition of NBR, vinyl chloride resin, and PMMA. It is the addition of the PMMA to the NBR/vinyl chloride resin system, in the amounts defined herein, that allows the production of the substantially closed cell, unusually low density foams of the present invention.

The compounding of the resin/rubber blend of the present invention, as well as the compounding of the entire foamable system in which it is used, may proceed in conventional manner. Rubbers, resins, fillers, plasticizers, waxes, fire retardants, smoke suppressants, and any other conventional ingredients in these foams would normally be first blended on a mill or a Banbury in accordance with conventional procedures. The rubber may first be broken down, if desired, and any other of these ingredients then added. When that portion of the final composition is suitably mixed, the curing agent system and the blowing agent may then be added. The point is, nothing in the resin/rubber blend of the present invention calls for special handling beyond that normally used in the art of blending rubbers and resins to make foamable mixtures.

At the same time, the resin/rubber blend of the present invention lends itself to compounding to achieve in the finished foam product any particular or special properties normally obtained in such products having the conventional higher density. Variations in plasticizers and in the amounts of plasticizers will produce variations in the softness or rigidity of the resulting foam according to conventional standards. Pigments can be added as desired to achieve any needed coloring. Flame resistance and smoke suppression can be taken into account in compounding in the usual ways. The conventional filler to be used will include the clays, finely ground or precipitated calcium carbonate, silicates, the carbon blacks, hydrated alumina, titanium dioxide, and other suitable fillers.

The blowing agent to be used will be any of the known, nitrogen-producing, chemical blowing agents to produce a closed cell structure. Such blowing agents include dinitroso pentamethylene tetramine, p,p′ oxybis (benzene sulfonyl hydrazide), benzene sulfonyl hydrazine, p-toluene sulfonyl semicarbazide, and, preferably, azodicarbonamide.

Curing agent systems may be any of those thoroughly understood in the art to produce foamed products from resin/rubber blends.

The plasticizers are conventional and may include tricresyl phosphate, dibutyl phthalate, di-2-ethylhexyl phthalate, butyl phthalyl butyl glycolate, dibutyl sebacate, and the like. Lubricants may be stearic acid, the paraffins, ceresin wax, or wax mixtures. Fire retardants include antimony trioxide, chlorinated paraffins, and other metal oxides.

Once the completed composition has been prepared, it may be shaped as desired. To form pipe insulation, standard extruders may be used to extrude hollow cylinders in the desired sizes. Sheets may be formed by extruding, calendering, or molding. Specially shaped objects may be formed by molding.

Once the finished composition has been shaped into the desired form, it will be heated to a temperature sufficient to decompose the blowing agent and cure the system. As is known, these systems expand linearly in that the finished, foamed dimensions consistently bear a constant relationship to the unfoamed composition. Temperature for expansion and cure will normally be in the range of about 220°–360° F., depending to a large extent on the thickness of the unfoamed composition to be expanded. Depending on the exact thickness dimension, sheets may be expanded at around 290° F. and tubes can be expanded at around 340° F., on an average.

As mentioned earlier, the principal advantage of the present invention is the ability to form unusually low density products in a reproducible manner. The present products show a significant improvement in smoke density on burning by virtue both of the low density of the product and the presence of the PMMA. At the same time, the thermal conductivity of the products used in heat insulation improves from a prior value of about 0.27 to a new value of about 0.25 Btu. in./hr. ft.$^2$° F.

The following example illustrates several embodiments of the invention.

EXAMPLE I

The following formulation and compounding procedure is conventional and well known in the art.

The following ingredients were placed in a Banbury, blended to a temperature in the range of 235°–290° F., and cooled:

| Ingredients | Parts by Weight |
| --- | --- |
| NBR/PVC blend 70/30 | 100 |
| stearic acid | 1 |
| magnesium silicate | 60 |
| carbon black | 10 |
| Kaolin clay | 30 |
| dioctyl phthalate | 20 |
| octyl diphenyl phosphate | 15 |
| wax blend | 2 |
| diphenylamine-diisobutylene reaction product | 2 |

The following ingredients in the amounts stated were then added and blended to a temperature in the range of 100°–200° F.:

| Ingredients | Parts by Weight |
| --- | --- |
| zinc oxide | 5 |
| surface coated urea | 1.5 |
| azodicarbonamide | 20 |
| benzothiazole disulfide | 0.8 |
| zinc diethyl dithiocarbonate | 0.8 |
| diorthotolyl guanidine | 0.8 |
| sulfur | 2.5 |

The finished composition represents a known and conventional foamable composition for producing, on appropriate heating, closed cell products having a density in the range of about 4.5–6 pounds/cu. ft.

EXAMPLE II

A series of nine compositions was made up, including the composition of Example I as a control and as a representative of prior technology. The compositions other than the control were varied by the addition of PMMA or vinyl chloride resin or additional blowing agent to illustrate the parameters of the invention. While each composition contains 100 parts by weight of a 70/30 mixture of NBR/VCVA, the addition of further VCVA change the proportions. The mixing procedure was the same for all nine compositions, and the final composition was extruded to form a hollow tube which was then free-blown at a temperature in the range of 250°-340° F. to form predominantly closed cell tubes. The following table shows the differing formulas and the results in each case.

| Run Data | 1 | 2 | 3 | 4 | 5 | 6 | 7 | 8 | 9 |
|---|---|---|---|---|---|---|---|---|---|
| NBR/PVC | 100 | 100 | 100 | 100 | 100 | 100 | 100 | 100 | 100 |
| PMMA | — | — | 7 | 13 | 35 | 81 | 97 | 20 | 97 |
| VCVA | — | — | — | — | — | — | — | 65 | 97 |
| Total PMMA/100 NBR | 0 | 0 | 10 | 19 | 50 | 116 | 139 | 29 | 139 |
| Total VC resin/100 NBR | 43 | 43 | 43 | 43 | 43 | 43 | 43 | 136 | 182 |
| PMMA, percent | 0 | 0 | 7 | 12 | 26 | 45 | 49 | 11 | 33 |
| Azodicarbonamide, percent | 7 | 10 | 10 | 10 | 10 | 10 | 10 | 10 | 8 |
| Density, lbs./ft.$^3$ | 4.5 | 3.6–6.5 | 4.6 | 4.7 | 2.9 | 3.4 | 3.6 | 3.2 | 3.8 |

Following are the commentary on each of the above runs:

Run 1 produced a good tube, conventional of the prior art, and having about the lowest reproducible density of the prior art of 4.5 pounds/cu. ft.

Run 2 produced a product having longitudinal splits down the outer surface, and different portions of the same run produced tubes of differing density and size. This Run 2 illustrates the point that it is not possible to achieve lower density tubes in prior resin/blend mixtures simply by increasing the amount of blowing agent used.

Runs 3 and 4 produced tubes having no improvement in density and having longitudinal splits rendering the tubes unsatisfactory, illustrating the effect of insufficient PMMA.

Runs 5, 6, 7, and 8 produced good, reproducible, low density tubes.

Run 9 produced a good, usable tube and illustrates the point that reduced blowing agent did not take the tube out of the very low density range.

EXAMPLE III

To illustrate use of a vinyl chloride resin consisting solely of VCVA, the following resin/blend composition was prepared in the usual manner:

| Ingredients | Parts by Weight |
|---|---|
| NBR | 95 |
| polybutadiene (processing aid) | 5 |
| VCVA | 110 |
| PMMA | 40 |

This resin/blend composition was compounded in the usual way with the usual fillers, plasticizers, fire retardants, wax blend, azodicarbonamide blowing agent, and a curing system. The final foamable composition was extruded in the form of tubes and heated and expanded in the usual manner to form a predominantly closed cell tube. The tubes were excellent in appearance, soft and flexible, reproducible, and had a density of 3.3 pounds/cu. ft.

What is claimed is:

1. A low density, predominantly closed cell foam composition having a resin/rubber blend comprising relative proportions of:
   (a) 100 parts by weight of a nitrile-butadiene rubber consisting essentially of acrylonitrile and butadiene;
   (b) 40–200 parts by weight vinyl chloride resin selected from the group consisting of polyvinyl chloride, vinyl chloride-vinyl acetate copolymer, and mixtures thereof; and
   (c) 25–200 parts by weight polymethylmethacrylate in which said polymethylmethacrylate is present in an amount of at least about 9 percent by weight of the mixture of (a), (b), and (c).

2. A foam according to claim 1 having a density in the range of about 1.8–4 pounds/cu. ft.

3. A foam according to claim 2 containing a mixture of polyvinyl chloride and vinyl chloride-vinyl acetate copolymer.

4. A heat-insulating foam product according to claim 1 having a thermal conductivity of about 0.25 Btu. in./hr. ft.$^2$° F.

* * * * *